United States Patent
Kulkarni et al.

(10) Patent No.: US 11,900,325 B2
(45) Date of Patent: Feb. 13, 2024

(54) UTILIZING A COMBINATION OF MACHINE LEARNING MODELS TO DETERMINE A SUCCESS PROBABILITY FOR A SOFTWARE PRODUCT

(71) Applicant: Accenture Global Solutions Limited, Dublin (IE)

(72) Inventors: Aditi Kulkarni, Bangalore (IN); Roopalaxmi Manjunath, Bangalore (IN); Sudha Srinivasan, Bangalore (IN); Rajesh Nagarajan, Chennai (IN); Koushik M. Vijayaraghavan, Chennai (IN); Nishanth Kumar, Udupi (IN); Sudhir Hanumanthappa, Bengaluru (IN); Parul Jagtap, Delhi (IN); Sangeetha Jayaram, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 382 days.

(21) Appl. No.: 17/379,388

(22) Filed: Jul. 19, 2021

(65) Prior Publication Data

US 2023/0017316 A1 Jan. 19, 2023

(51) Int. Cl.
*G06Q 10/10* (2023.01)
*G06Q 10/0639* (2023.01)
(Continued)

(52) U.S. Cl.
CPC .......... *G06Q 10/103* (2013.01); *G06N 5/04* (2013.01); *G06N 20/00* (2019.01); *G06Q 10/06393* (2013.01)

(58) Field of Classification Search
CPC .......... G06Q 10/103; G06Q 10/06393; G06N 20/00; G06N 5/04
See application file for complete search history.

(56) References Cited

U.S. PATENT DOCUMENTS 11,651,212 B2 * 5/2023 Xu ................. G06N 3/045
706/21
2017/0249234 A1 * 8/2017 Kalech ............. G06F 11/0793
(Continued)

OTHER PUBLICATIONS

Iris Fabiana de Barcelos Tronto et al., "An investigation of artificial neural networks based prediction systems in software project management," 2008 [retrieved on Sep. 27, 2023], the Journal of Systems and Software 81 (2008), pp. 356-367, downloaded from <url>: https://www.sciencedirect.com. (Year: 2008).*

(Continued)

*Primary Examiner* — S. Sough
*Assistant Examiner* — Stephen D Berman
(74) *Attorney, Agent, or Firm* — Harrity & Harrity, LLP

(57) ABSTRACT

A device may receive project management data associated with development of a software product and may process a first portion of the project management data, with first models, to generate timeliness scores and an overall timeliness score for the software product. The device may process a second portion of the project management data, with second models, to generate quality scores and an overall quality score for the software product and may process a third portion of the project management data, with third models, to generate product readiness scores and an overall product readiness score for the software product. The device may utilize a fourth machine learning model, with the overall timeliness score, the overall quality score, and the overall product readiness score, to generate a success probability for the software product and may perform one or more actions based on the success probability for the software product.

20 Claims, 10 Drawing Sheets

(51) Int. Cl.
    *G06N 5/04*        (2023.01)
    *G06N 20/00*     (2019.01)

(56) References Cited

U.S. PATENT DOCUMENTS

| | | |
|---|---|---|
| 2019/0138300 A1 | 5/2019 | Burli et al. |
| 2020/0019393 A1 | 1/2020 | Vichare et al. |
| 2020/0126012 A1* | 4/2020 | Bailey .................. G06N 5/02 |
| 2022/0366214 A1* | 11/2022 | Wu .................... G06N 3/042 |

OTHER PUBLICATIONS

Anh Viet Phan et al., "Convolutional neural networks on assembly code for predicting software defects," 2017 [retrieved on Sep. 27, 2023], 21st Asia Pacific Symposium on Intelligent and Evolutionary Systems (IES), pp. 37-42, downloaded from <url>:https://ieeexplore.ieee.org. (Year: 2017).*

Yong Hu et al., "Software Project Risk Management Modeling with Neural Network and Support Vector Machine Approaches," 2007 [retrieved on Sep. 27, 2023], Third International Conference on Natural Computation (ICNC 2007), pp. 1-5, downloaded from <url>:https://ieeexplore.ieee.org. (Year: 2007).*

* cited by examiner

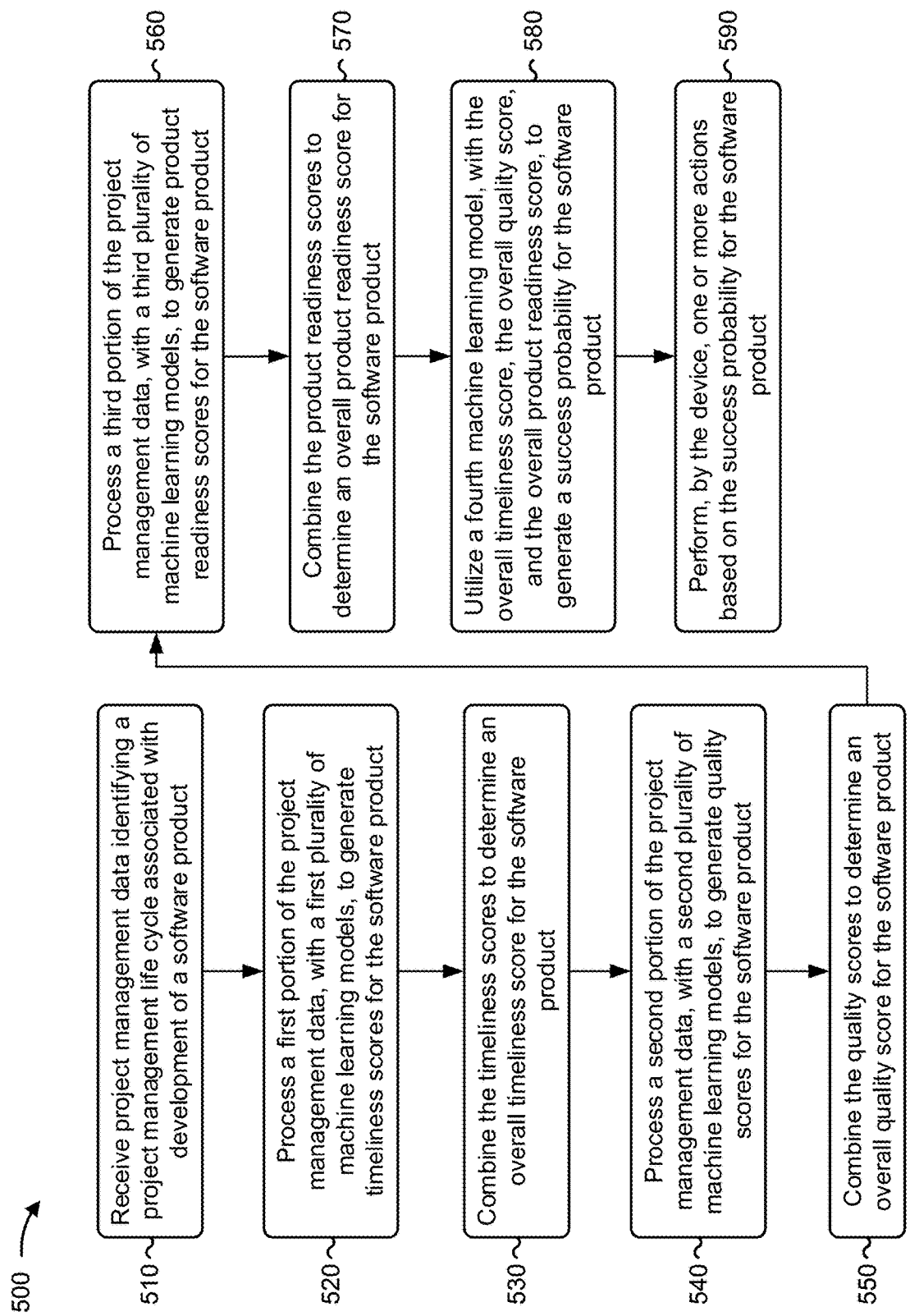

UTILIZING A COMBINATION OF MACHINE LEARNING MODELS TO DETERMINE A SUCCESS PROBABILITY FOR A SOFTWARE PRODUCT

BACKGROUND

The software development life cycle, also referred to as the application development life-cycle, is a process for planning, creating, testing, and deploying an information system, a software product, and/or the like. The software development life cycle may be applied to a range of hardware and software configurations, as an information system can be composed of hardware only, software only, or a combination of both. There are multiple stages in the software development life cycle, such as a requirement analysis stage, a design stage, a development and testing stage, an implementation stage, a documentation stage, an evaluation stage, and/or the like.

SUMMARY

Some implementations described herein relate to a method. The method may include receiving project management data identifying a project management life cycle associated with development of a software product and processing a first portion of the project management data, with a first plurality of machine learning models, to generate timeliness scores for the software product. The method may include combining the timeliness scores to determine an overall timeliness score for the software product and processing a second portion of the project management data, with a second plurality of machine learning models, to generate quality scores for the software product. The method may include combining the quality scores to determine an overall quality score for the software product and processing a third portion of the project management data, with a third plurality of machine learning models, to generate product readiness scores for the software product. The method may include combining the product readiness scores to determine an overall product readiness score for the software product and utilizing a fourth machine learning model, with the overall timeliness score, the overall quality score, and the overall product readiness score, to generate a success probability for the software product. The method may include performing one or more actions based on the success probability for the software product.

Some implementations described herein relate to a device. The device may include one or more memories and one or more processors coupled to the one or more memories. The one or more processors may be configured to receive project management data identifying a project management life cycle associated with development of a software product and process a first portion of the project management data, with a first plurality of machine learning models, to generate timeliness scores for the software product. The one or more processors may be configured to combine the timeliness scores to determine an overall timeliness score for the software product and process a second portion of the project management data, with a second plurality of machine learning models, to generate quality scores for the software product. The one or more processors may be configured to combine the quality scores to determine an overall quality score for the software product and process a third portion of the project management data, with a third plurality of machine learning models, to generate product readiness scores for the software product. The one or more processors may be configured to combine the product readiness scores to determine an overall product readiness score for the software product and process the overall timeliness score, the overall quality score, and the overall product readiness score, with a fourth machine learning model, to generate a success probability for the software product. The one or more processors may be configured to perform one or more actions based on the success probability for the software product.

Some implementations described herein relate to a non-transitory computer-readable medium that stores a set of instructions for a device. The set of instructions, when executed by one or more processors of the device, may cause the device to receive project management data identifying a project management life cycle associated with development of a software product and process a first portion of the project management data, with a first plurality of machine learning models, to generate timeliness scores for the software product and an overall timeliness score based on the timeliness scores. The set of instructions may cause the device to process a second portion of the project management data, with a second plurality of machine learning models, to generate quality scores for the software product and an overall quality score based on the quality scores. The set of instructions may cause the device to process a third portion of the project management data, with a third plurality of machine learning models, to generate product readiness scores for the software product and an overall product readiness score based on the product readiness scores. The set of instructions may cause the device to utilize a fourth machine learning model, with the overall timeliness score, the overall quality score, and the overall product readiness score, to generate a success probability for the software product and perform one or more actions based on the success probability for the software product.

BRIEF DESCRIPTION OF THE DRAWINGS

FIG. 5 is a flowchart of an example process for utilizing a combination of machine learning models to determine a success probability for a software product.

DETAILED DESCRIPTION

Figure 1A:
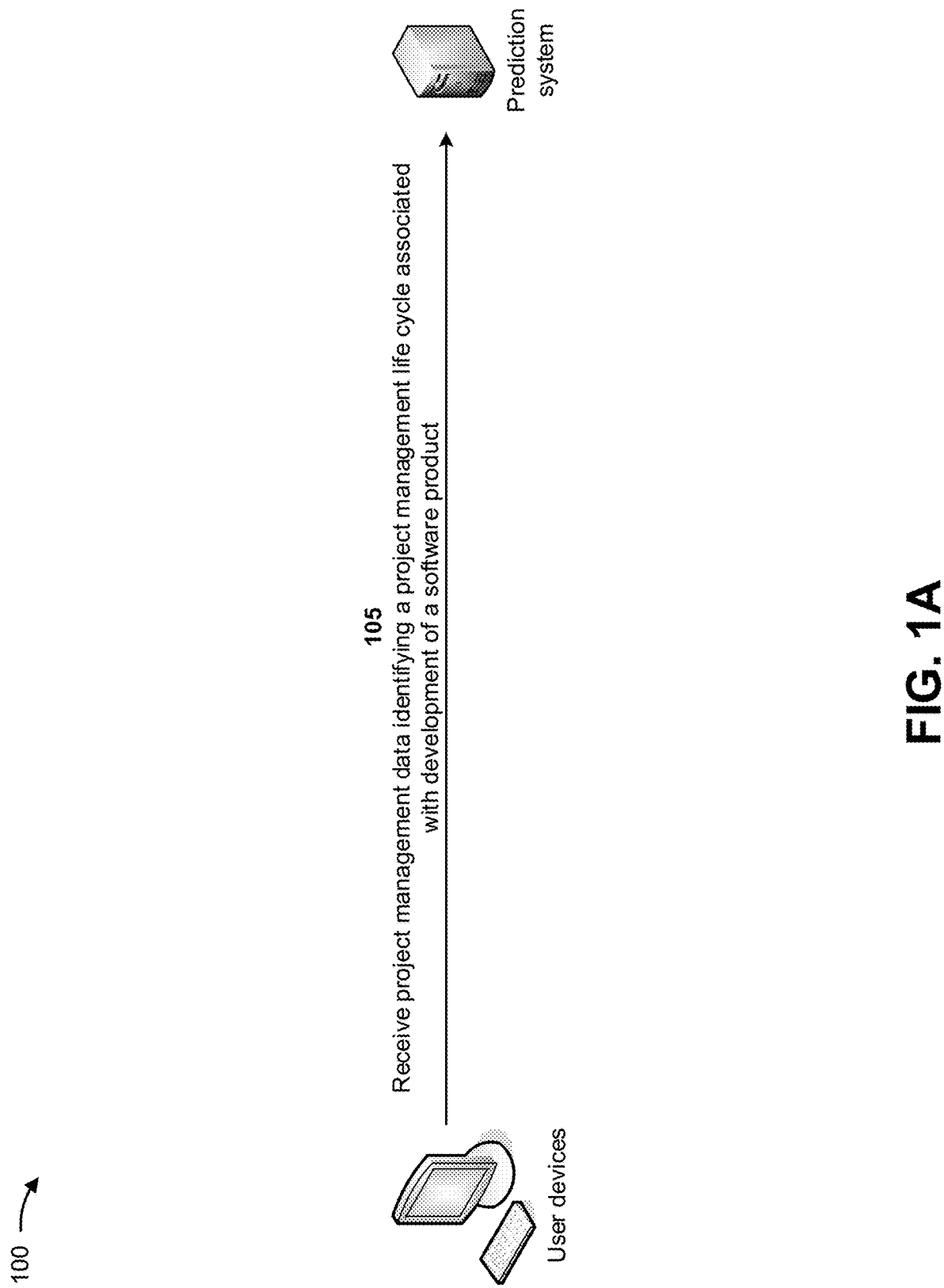
FIGS. 1A-1F are diagrams of an example implementation described herein.

The following detailed description of example implementations refers to the accompanying drawings. The same reference numbers in different drawings may identify the same or similar elements.

Currently, in a software development project management life cycle, there are prediction engines available that perform some predictions across different phases of the software development life cycle, such as a velocity prediction (e.g., a time to deliver a software product, software product defect inflow prediction, and/or the like). However, there is no single platform that analyzes an end-to-end software product life cycle and provides a prediction of success of the software product based on influencing factors across the life cycle of the software product development.

Therefore, current techniques for monitoring and managing a software development life cycle consume computing resources (e.g., processing resources, memory resources, communication resources, and/or the like), networking resources, and/or the like associated with generating a software product that is inoperable, generating a software product that is not timely, losing opportunities for the business based on the inoperable or untimely software product, correcting the inoperable software product, and/or the like.

Some implementations described herein relate to a prediction system that utilizes a combination of machine learning models to determine a success probability for a software product. For example, the prediction system may receive project management data identifying a project management life cycle associated with development of a software product and may process a first portion of the project management data, with a first plurality of machine learning models, to generate timeliness scores for the software product. The prediction system may combine the timeliness scores to determine an overall timeliness score for the software product and may process a second portion of the project management data, with a second plurality of machine learning models, to generate quality scores for the software product. The prediction system may combine the quality scores to determine an overall quality score for the software product and may process a third portion of the project management data, with a third plurality of machine learning models, to generate product readiness scores for the software product. The prediction system may combine the product readiness scores to determine an overall product readiness score for the software product and may utilize a fourth machine learning model, with the overall timeliness score, the overall quality score, and the overall product readiness score, to generate a success probability for the software product. The prediction system may perform one or more actions based on the success probability for the software product.

In this way, the prediction system utilizes a combination of machine learning models to determine a success probability for a software product. The prediction system may analyze an end-to-end software product life cycle and may provide a prediction of success of the software product. The prediction system may utilize influencing factors, such as software product timeliness, software product quality, and software product readiness, to determine the success probability for the software product. The prediction system may include forward and backward prediction use cases that enable a project manager to take necessary actions for a successful release of the software product. The prediction system may provide a hassle-free software product release by gathering and predicting unforeseen issues across multiple stages of the software development life cycle. This, in turn, conserves computing resources, networking resources, and/or the like that would otherwise have been consumed in generating a software product that is inoperable, generating a software product that is not timely, losing opportunities for the business based on the inoperable or untimely software product, correcting the inoperable software product, and/or the like.

FIGS. 1A-1F are diagrams of an example 100 associated with utilizing a combination of machine learning models to determine a success probability for a software product. As shown in FIGS. 1A-1F, example 100 includes user devices and a prediction system. Each of the user devices may include a desktop computer, a tablet computer, a laptop computer, and/or the like. The prediction system may include a system that utilizes a combination of machine learning models to determine a success probability for a software product. Further details of the user devices and the prediction system are provided elsewhere herein.

As shown in FIG. 1A, and by reference number 105, the prediction system may receive, from the user devices, project management data identifying a project management life cycle associated with development of a software product. The user devices may be associated with developers of the software product. The project management data may include data identifying dependencies associated with the software product, a requirement quality of the software product, test coverage associated with the software product, defects associated with the software product, technical objects associated with the software product, rework effort to fix defects in the software product, additional work accepted for the software product, dependencies between software development teams associated with the software product, planned and available capacity associated with the software product, effort spent on development of the software product, emergency tickets associated with the software product, rework associated with the software product, code complexity of the software product, code coverage of the software product, log failures associated with the software product, cloud readiness of the software product, user stories and requirements associated with the software product, service call responses associated with the software product, performance issues associated with the software product, and/or the like.

The prediction system may continuously receive the project management data, may periodically receive the project management data, may receive the project management data upon request by the prediction system, and/or the like. In some implementations, the prediction system may store the project management data in a data structure (e.g., a database, a table, a list, and/or the like) associated with the prediction system.

Figure 1B:
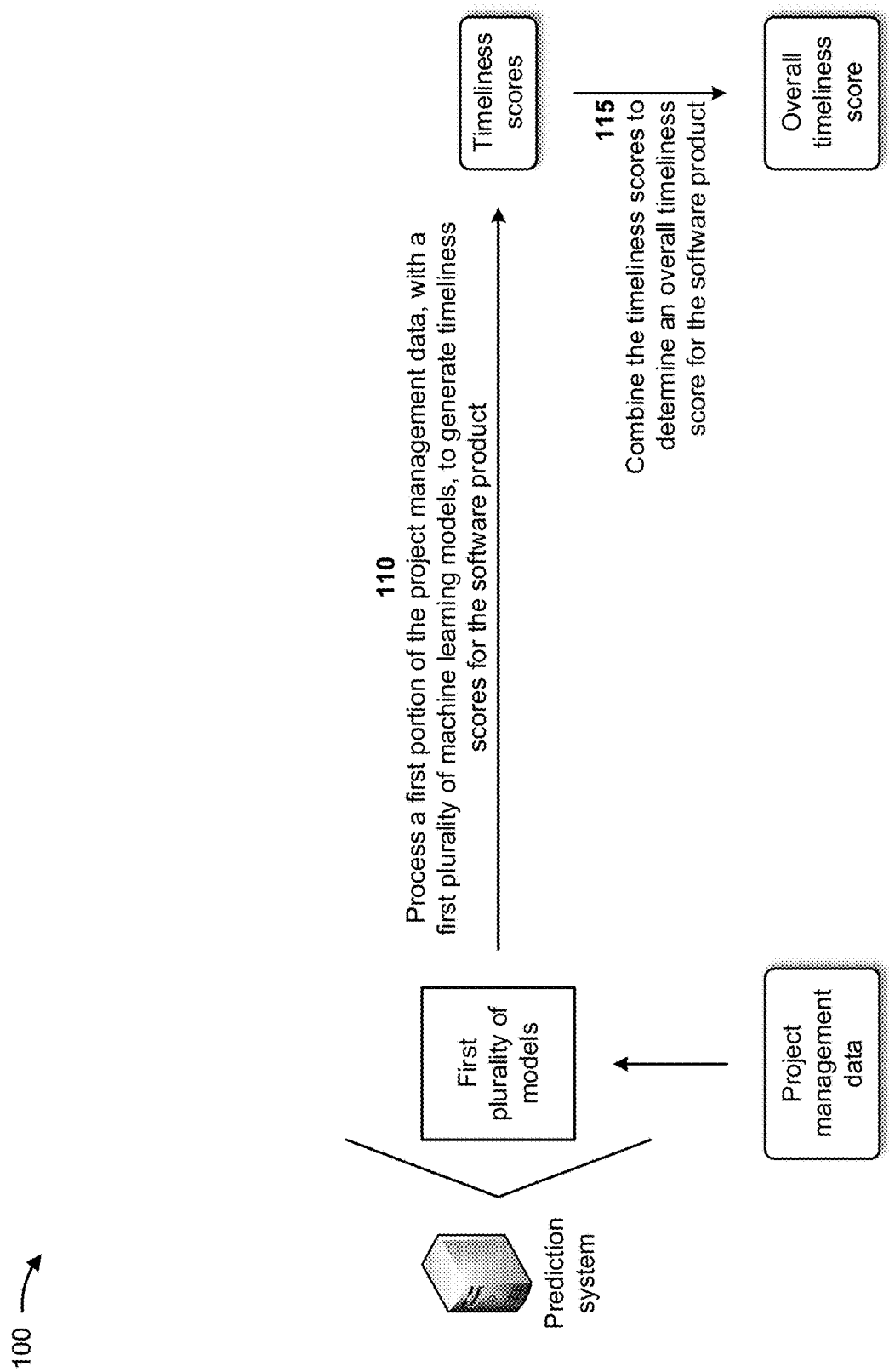

As shown in FIG. 1B, and by reference number 110, the prediction system may process a first portion of the project management data, with a first plurality of machine learning models, to generate timeliness scores for the software product. The first portion of the project management data may include data identifying user story quality associated with the software product, dependencies associated with the software product, risk and issues associated with the software product, missing test cases associated with the software product, technical objects associated with the software product, change requests and feedback associated with the software product, acceptance criteria changes in a user story of the software product, defects associated with the software product, rework effort to fix defects in the software product, build failures associated with the software product, velocity deviation associated with the software product, unplanned inter-team dependencies associated with the software product, planned and available capacity associated with the software product, and/or the like.

The prediction system may process the data identifying the user story quality associated with the software product, the dependencies associated with the software product, the risk and issues associated with the software product, the missing test cases associated with the software product, and the technical objects associated with the software product, with a machine learning model (e.g., a story viability predictor model), to generate a first timeliness score (e.g., a viability score) for the software product.

The prediction system may process the data identifying the change requests and feedback associated with the software product, the acceptance criteria changes in the user story of the software product, and the defects associated with the software product, with a machine learning model (e.g., a scope creep predictor model), to generate a second timeliness score (e.g., a percentage of user stories greater than planned user stories) for the software product.

The prediction system may process the data identifying the defects associated with the software product, the rework effort to fix the defects in the software product, the build failures associated with the software product, and the velocity deviation associated with the software product, with a machine learning model (e.g., a delay predictor model), to generate a third timeliness score (e.g., a score based on a delay time associated with release of the software product) for the software product.

The prediction system may process the data identifying the unplanned inter-team dependencies associated with the software product, with a machine learning model (e.g., an inter-team dependencies model), to generate a fourth timeliness score (e.g., a score based on a quantity of dependencies associated with the software product) for the software product.

The prediction system may process the data identifying the planned and available capacity associated with the software product, with a machine learning model (e.g., a capacity need model), to generate a fifth timeliness score (e.g., a percentage velocity deviation associated with the software product) for the software product.

In some implementations, the prediction system processes the first portion of the project management data, with one or more of the story viability predictor model, the scope creep predictor model, the delay predictor model, the inter-team dependencies model, or the capacity need model, to generate the timeliness scores for the software product.

As further shown in FIG. 1B, and by reference number 115, the prediction system may combine the timeliness scores to determine an overall timeliness score for the software product. In some implementations, the prediction system combines the timeliness scores to determine the overall timeliness score by averaging the timeliness scores to determine the overall timeliness score. In some implementations, the prediction system combines the timeliness scores to determine the overall timeliness score by applying weights to the timeliness scores to generate weighted timeliness scores, and combining the weighted timeliness scores to determine the overall timeliness score.

Figure 1C:
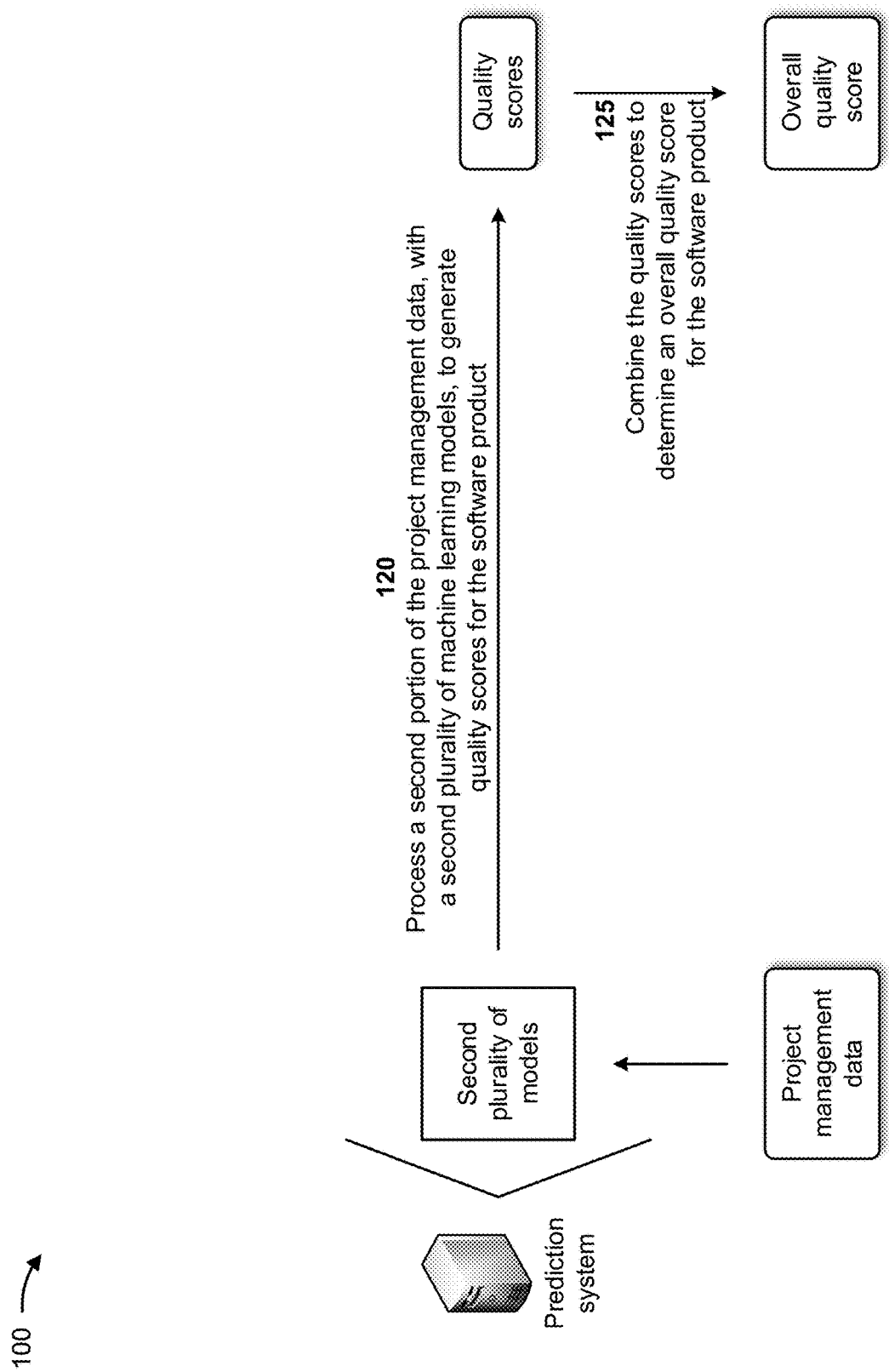

As shown in FIG. 1C, and by reference number 120, the prediction system may process a second portion of the project management data, with a second plurality of machine learning models, to generate quality scores for the software product. The second portion of the project management data may include data identifying user story quality associated with the software product, user story points associated with the software product, dependencies associated with the software product, test coverage associated with the software product, missing test cases associated with the software product, code complexity associated with the software product, software resilience and software agility scores associated with the software product, code smell associated with the software product, lines of code of the software product, log files associated with the software product, and/or the like.

The prediction system may process the data identifying the user story quality associated with the software product, the user story points associated with the software product, and the dependencies associated with the software product, with a machine learning model (e.g., a rework predictor model), to generate a first quality score (e.g., a percent rework) for the software product.

The prediction system may process the data identifying the test coverage associated with the software product, the missing test cases associated with the software product, and the code complexity associated with the software product, with a machine learning model (e.g., a defect predictor model), to generate a second quality score (e.g., a score based on a phase with maximum defects) for the software product.

The prediction system may process the data identifying the software resilience and software agility scores associated with the software product, with a machine learning model (e.g., a cloud readiness model), to generate a third quality score (e.g., a cloud readiness score) for the software product.

The prediction system may process the data identifying the code smell associated with the software product and the lines of code of the software product, with a machine learning model (e.g., a code quality model), to generate a fourth quality score (e.g., a maximum technical debt score) for the software product.

The prediction system may process the data identifying the log files associated with the software product, with a machine learning model (e.g., a service call failure model), to generate a fifth quality score (e.g., a score based on a quantity of application programming interfaces (APIs) with high service call failures) for the software product.

In some implementations, the prediction system processes the second portion of the project management data, with one or more of the rework predictor model, the defect predictor model, the cloud readiness model, the code quality model, or the service call failure model, to generate the quality scores for the software product.

As further shown in FIG. 1C, and by reference number 125, the prediction system may combine the quality scores to determine an overall quality score for the software product. In some implementations, the prediction system combines the quality scores to determine the overall quality score by averaging the quality scores to determine the overall quality score. In some implementations, the prediction system combines the quality scores to determine the overall quality score by applying weights to the quality scores to generate weighted quality scores, and combining the weighted quality scores to determine the overall quality score.

Figure 1D:
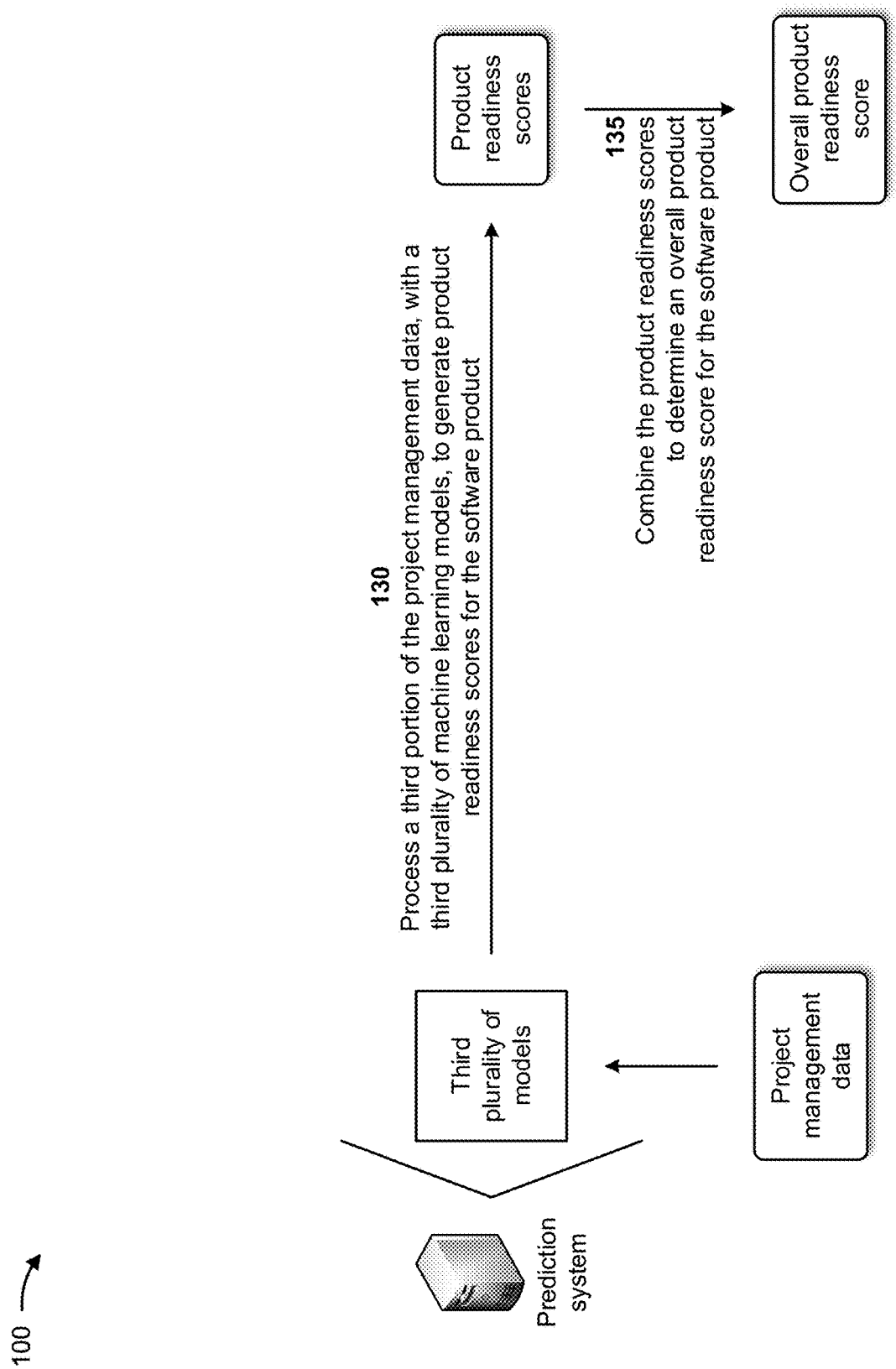

As shown in FIG. 1D, and by reference number 130, the prediction system may process a third portion of the project management data, with a third plurality of machine learning models, to generate product readiness scores for the software product. The third portion of the project management data may include data identifying must have user stories associated with the software product, a quantity of functional areas impacted by the software product, a quantity of failed transactions associated with the software product, a sustainability score (e.g., a mean time recover) associated with the software product, a quantity of transactions associated with the software product and not satisfying a service level agreement, a quantity of feedback associated with the software product and addressed for highly utilized areas, and/or the like.

The prediction system may process the data identifying the must have user stories associated with the software product and the quantity of functional areas impacted by the software product, with a machine learning model (e.g., a business value predictor model), to generate a first product readiness score (e.g., a percent of business value to be provided) for the software product.

The prediction system may process the data identifying the quantity of failed transactions associated with the software product and the sustainability score associated with the software product, with a machine learning model (e.g., an incident inflow predictor model), to generate a second product readiness score (e.g., a score based on a quantity of incidents predicted in production) for the software product.

The prediction system may process the data identifying the quantity of transactions associated with the software product and not satisfying a service level agreement and the quantity of feedback associated with the software product and addressed for highly utilized areas, with a machine learning model (e.g., a performance and stability predictor model), to generate a third product readiness score (e.g., a cloud readiness score) for the software product.

In some implementations, the prediction system processes the third portion of the project management data, with one or more of the business value predictor model, the incident inflow predictor model, or the performance and stability predictor model, to generate the product readiness scores for the software product.

As further shown in FIG. 1D, and by reference number 135, the prediction system may combine the product readiness scores to determine an overall product readiness score for the software product. In some implementations, the prediction system combines the product readiness scores to determine the overall product readiness score by averaging the product readiness scores to determine the overall product readiness score. In some implementations, the prediction system combines the product readiness scores to determine the overall product readiness score by applying weights to the product readiness scores to generate weighted product readiness scores, and combining the weighted product readiness scores to determine the overall product readiness score.

Figure 1E:
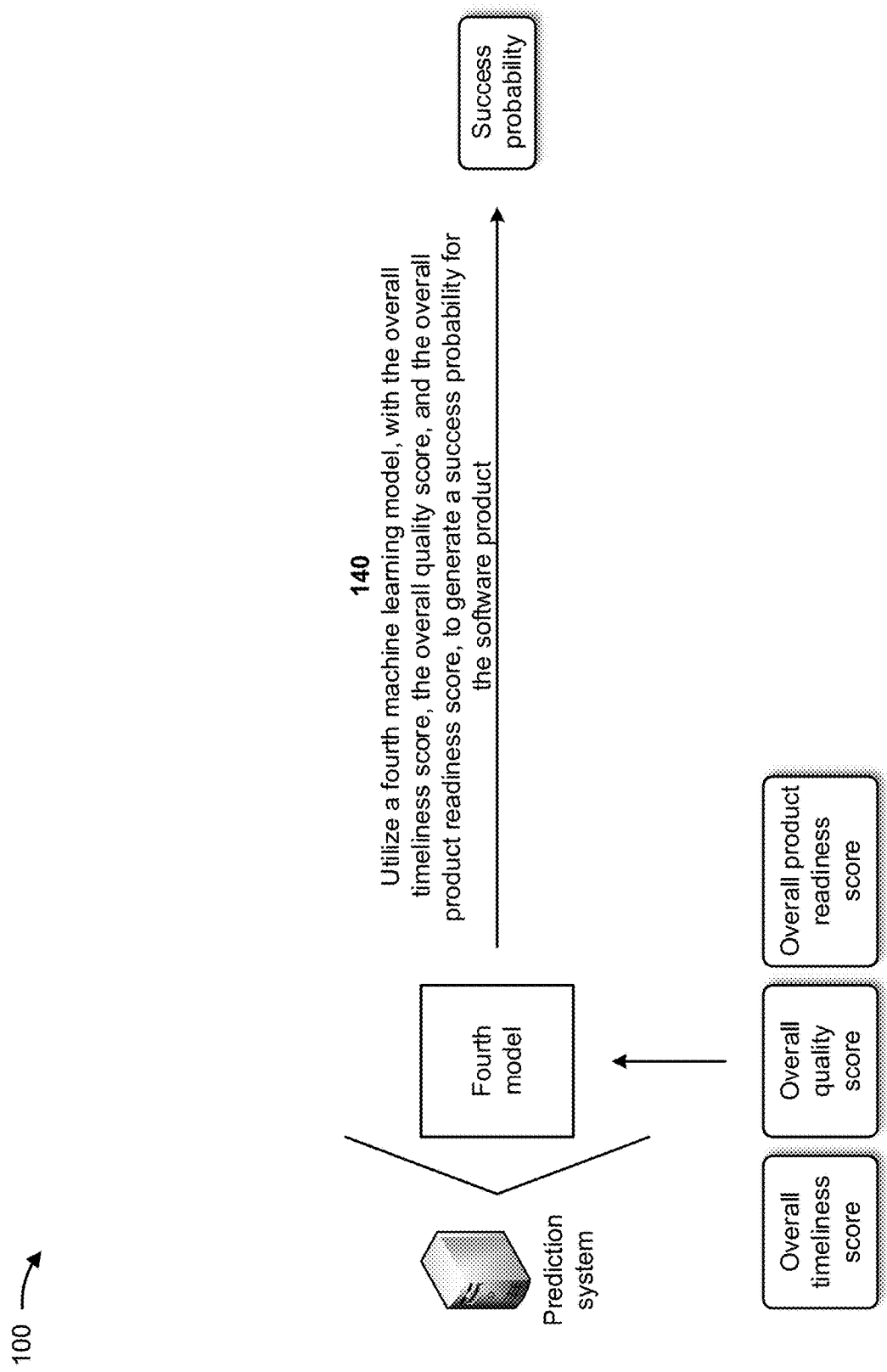

As shown in FIG. 1E, and by reference number 140, the prediction system may utilize a fourth machine learning model, with the overall timeliness score, the overall quality score, and the overall product readiness score, to generate a success probability for the software product. For example, the prediction system may determine, with the fourth machine learning model, weights to apply to the overall timeliness score, the overall quality score, and the overall product readiness score, and may apply the weights to the overall timeliness score, the overall quality score, and the overall product readiness score to generate a weighted timeliness score, a weighted quality score, and a weighted product readiness score. The prediction system may combine the weighted timeliness score, the weighted quality score, and the weighted product readiness score to generate the success probability for the software product. In some implementations, the success probability may include a probability of release success of the software product.

In some implementations, each of the first plurality of machine learning models, each of the second plurality of machine learning models, each of the third plurality of machine learning models, and the fourth machine learning model may include a logistic regression model, a decision tree model, a naïve Bayes model, a linear regression model, a support vector machine-based regression model, or a neural network regression model. In some implementations, the prediction system may utilize natural language processing, natural language generation, and/or the like for text processing of the software code and/or the project management data.

Figure 1F:
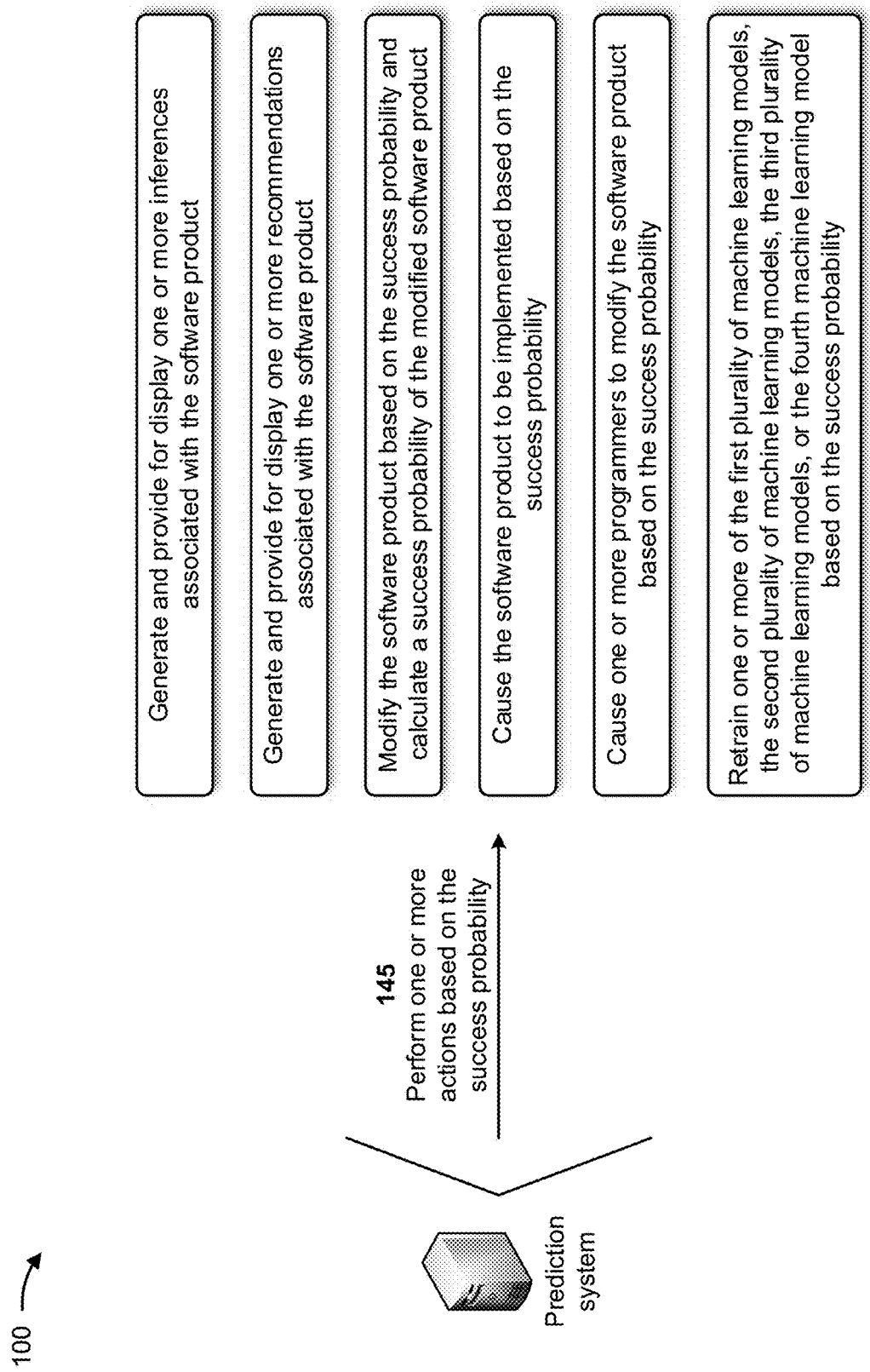

As shown in FIG. 1F, and by reference number 145, the prediction system may perform one or more actions based on the success probability. In some implementations, the one or more actions include the prediction system generating and providing for display one or more inferences associated with the software product. For example, the prediction system may generate the one or more inferences based on the success probability, such as an inference narrative indicating that the software product will fail based on the success probability, an inference narrative indicating that the software product will be successful based on the success probability, and/or the like. The prediction system may provide the one or more inferences to a user device and the user device may display the one or more inferences to a user of the user device. In this way, the prediction system conserves computing resources, networking resources, and/or the like that would otherwise have been consumed in generating a software product that is inoperable, generating a software product that is not timely, losing opportunities for the business based on the inoperable or untimely software product, correcting the inoperable software product, and/or the like.

In some implementations, the one or more actions include the prediction system generating and providing for display one or more recommendations associated with the software product. For example, the prediction system may determine one or more recommendations based on the success probability, such as a recommendation indicating that the software product should be modified before being put into production, a recommendation indicating that the software product should be released immediately, and/or the like. The prediction system may provide the one or more recommendations to a user device and the user device may display the one or more recommendations to a user of the user device. In this way, the prediction system conserves computing resources, networking resources, and/or the like that would otherwise have been consumed in generating a software product that is inoperable, losing opportunities for the business based on the inoperable software product, and/or the like.

In some implementations, the one or more actions include the prediction system modifying the software product based on the success probability and calculating a success probability of the modified software product. For example, the prediction system may determine one or more modifications to the software product based on the success probability and may implement the one or more modifications to generate the modified software product. The prediction system may then recalculate the success probability for the modified software product. If the recalculated success probability is satisfactory, the prediction system may cause the modified software product to be implemented. In this way, the prediction system conserves computing resources, networking resources, and/or the like that would otherwise have been consumed in generating a software product that is inoperable, losing opportunities for the business based on the inoperable software product, and/or the like.

In some implementations, the one or more actions include the prediction system causing the software product to be implemented based on the success probability. For example, the prediction system may determine that the success probability indicates that the software product will be successful. Based on this determination, the prediction system may cause the software product to be implemented (e.g., put into production). In this way, the prediction system conserves computing resources, networking resources, and/or the like that would otherwise have been consumed in unnecessarily testing the software product, unnecessarily waiting to release the software product, unnecessarily updating the software product, and/or the like.

In some implementations, the one or more actions include the prediction system causing one or more programmers to modify the software product based on the success probability. For example, the prediction system may determine one or more modifications to the software product based on the success probability and may provide the one or more modifications to one or more programmers via user devices. The one or more programmers may utilize the user devices to implement the one or more modifications and to generate a modified software product. The prediction system may cause the modified software product to be implemented. In this way, the prediction system conserves computing resources, networking resources, and/or the like that would otherwise have been consumed in generating a software product that is inoperable, losing opportunities for the business based on the inoperable software product, and/or the like.

In some implementations, the one or more actions include the prediction system retraining one or more of the first plurality of machine learning models, the second plurality of machine learning models, the third plurality of machine learning models, or the fourth machine learning model based on the success probability. The prediction system may utilize the success probability as additional training data for retraining the one or more of the first plurality of machine learning models, the second plurality of machine learning models, the third plurality of machine learning models, or the fourth machine learning model, thereby increasing the quantity of training data available for training the one or more of the first plurality of machine learning models, the second plurality of machine learning models, the third plurality of machine learning models, or the fourth machine learning model. Accordingly, the prediction system may conserve computing resources associated with identifying, obtaining, and/or generating historical data for training the one or more of the first plurality of machine learning models, the second plurality of machine learning models, the third plurality of machine learning models, or the fourth machine learning model relative to other systems for identifying, obtaining, and/or generating historical data for training machine learning models.

In this way, the prediction system utilizes a combination of machine learning models to determine a success probability for a software product. The prediction system may analyze an end-to-end software product life cycle and may provide a prediction of success of the software product. The prediction system may utilize influencing factors, such as software product timeliness, software product quality, and software product readiness, to determine the success probability for the software product. The prediction system may include forward and backward prediction use cases that enable a project manager to take necessary actions for a successful release of the software product. The prediction system may provide a hassle-free software product release by gathering and predicting unforeseen issues across multiple stages of the software development life cycle. This, in turn, conserves computing resources, networking resources, and/or the like that would otherwise have been consumed in generating a software product that is inoperable, generating a software product that is not timely, losing opportunities for the business based on the inoperable or untimely software product, correcting the inoperable software product, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
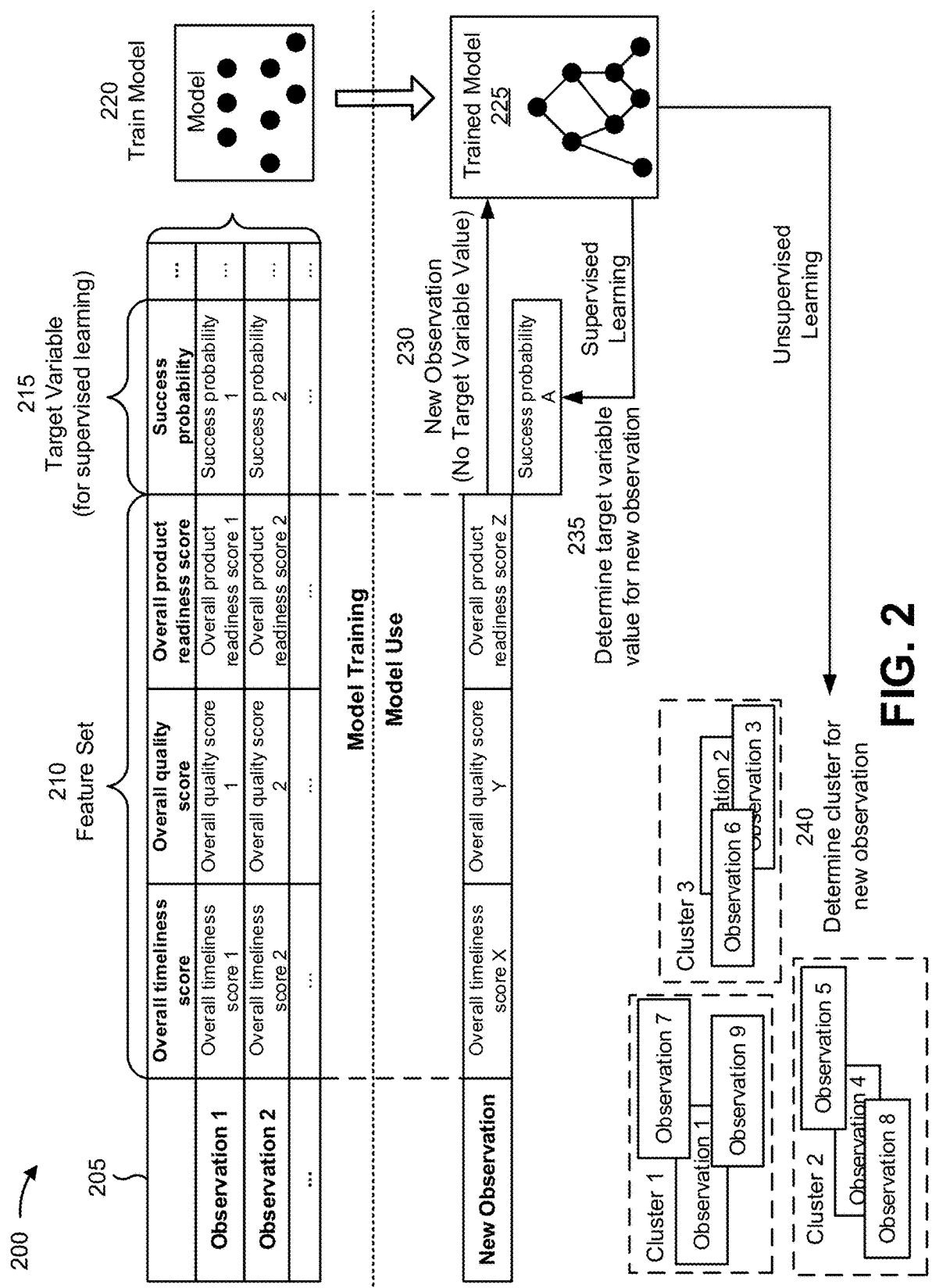
FIG. 2 is a diagram illustrating an example of training and using a machine learning model in connection with determining a success probability for a software product.

FIG. 2 is a diagram illustrating an example 200 of training and using a machine learning model (e.g., the fourth machine learning model) in connection with determining a success probability for a software product. The machine learning model training and usage described herein may be performed using a machine learning system. The machine learning system may include or may be included in a computing device, a server, a cloud computing environment, and/or the like, such as the prediction system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the prediction system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the prediction system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of an overall timeliness score, a second feature of an overall quality score, a third feature of an overall product readiness score, and so on. As shown, for a first observation, the first feature may have a value of overall timeliness core 1, the second feature may have a value of overall quality score 1, the third feature may have a value of overall product readiness score 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a success probability, which has a value of success probability 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of overall timeliness score X, a second feature of overall quality score Y, a third feature of overall product readiness score Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of success probability A for the target variable of the success probability for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an overall timeliness score cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an overall quality score cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine a success probability for a software product. The machine learning system enables recognition and/or identification of tens, hundreds, thousands, or millions of features and/or feature values for tens, hundreds, thousands, or millions of observations, thereby increasing accuracy and consistency and reducing delay associated with determining a success probability for a software product relative to requiring computing resources to be allocated for tens, hundreds, or thousands of operators to manually determine a success probability for a software product.

As indicated above, FIG. 2 is provided as an example. Other examples may differ from what is described in connection with FIG. 2.

Figure 3:
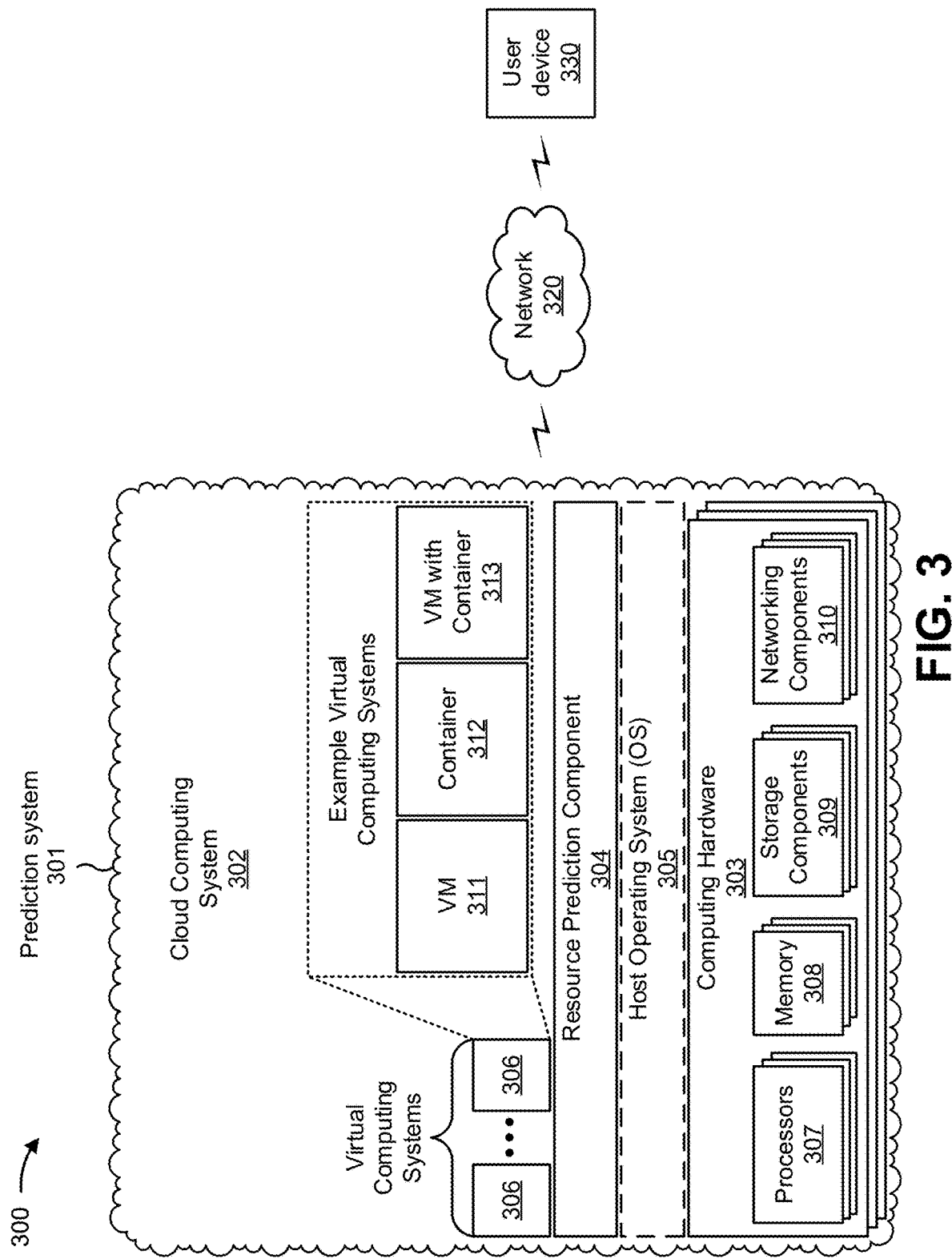
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a prediction system 301, which may include one or more elements of and/or may execute within a cloud computing system 302. The cloud computing system 302 may include one or more elements 303-313, as described in more detail below. As further shown in FIG. 3, environment 300 may include a network 320 and/or a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the prediction system 301 may include one or more elements 303-313 of the cloud computing system 302, may execute within the cloud computing system 302, and/or may be hosted within the cloud computing system 302, in some implementations, the prediction system 301 may not be cloud-based (e.g., may be implemented outside of a cloud computing system) or may be partially cloud-based. For example, the prediction system 301 may include one or more devices that are not part of the cloud computing system 302, such as device 400 of FIG. 4, which may include a stand-alone server or another type of computing device. The prediction system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
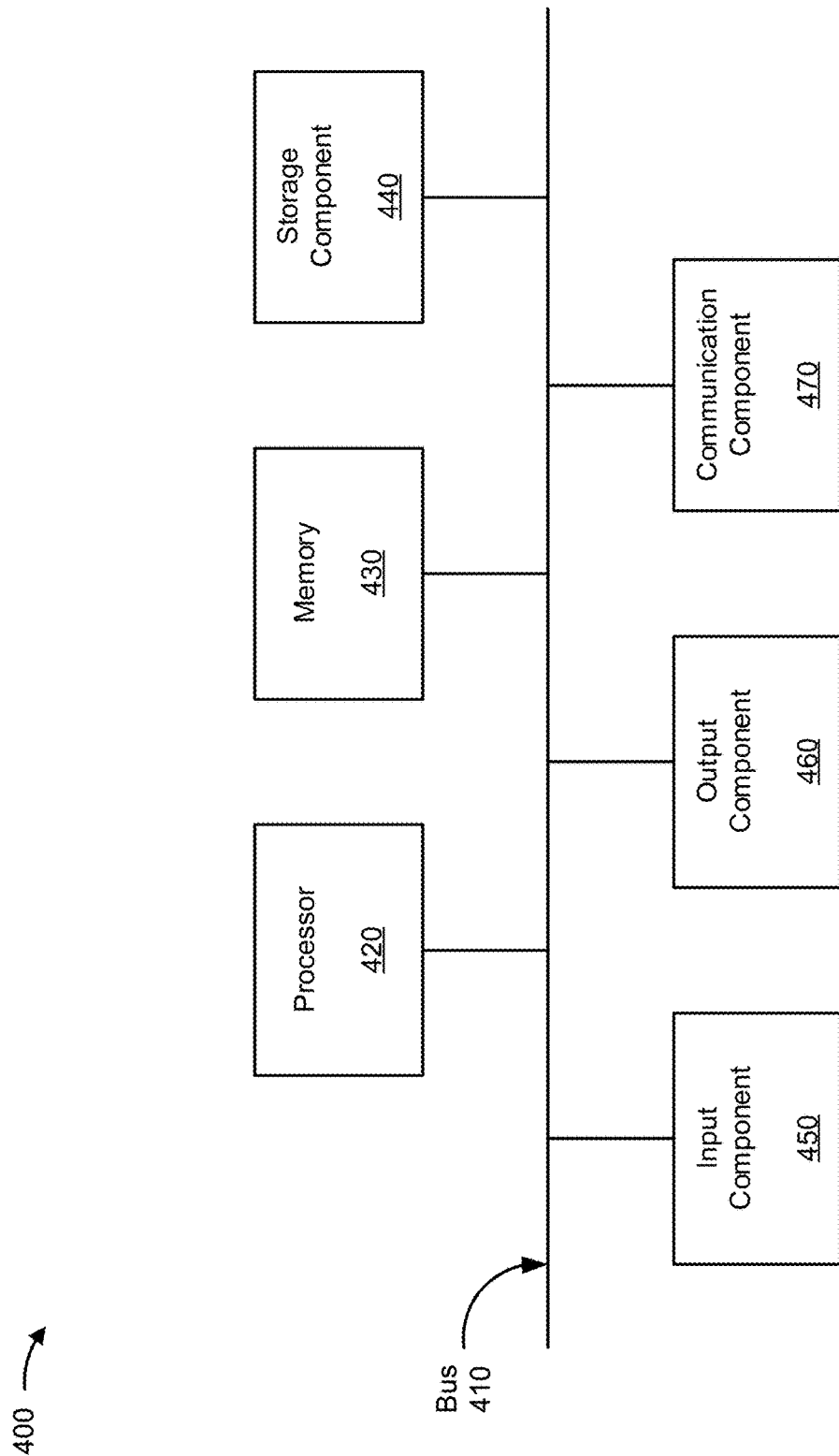
FIG. 4 is a diagram of example components of one or more devices of FIG. 3.

FIG. 4 is a diagram of example components of a device 400, which may correspond to prediction system 301 and/or user device 330. In some implementations, prediction system 301 and/or user device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing a combination of machine learning models to determine a success probability for a software product. In some implementations, one or more process blocks of FIG. 5 may be performed by a device (e.g., the prediction system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving project management data identifying a project management life cycle associated with development of a software product (block 510). For example, the device may receive project management data identifying a project management life cycle associated with development of a software product, as described above.

As further shown in FIG. 5, process 500 may include processing a first portion of the project management data, with a first plurality of machine learning models, to generate timeliness scores for the software product (block 520). For example, the device may process a first portion of the project management data, with a first plurality of machine learning models, to generate timeliness scores for the software product, as described above. In some implementations, processing the first portion of the project management data, with the first plurality of machine learning models, to generate the timeliness scores for the software product, includes two or more of processing the first portion of the project management data, with a story viability predictor model, to generate a first timeliness score, processing the first portion of the project management data, with a score creep predictor model, to generate a second timeliness score, processing the first portion of the project management data, with a delay predictor model, to generate a third timeliness score, processing the first portion of the project management data, with an inter-team dependencies model, to generate a fourth timeliness score, or processing the first portion of the project management data, with a capacity need model, to generate a fifth timeliness score.

As further shown in FIG. 5, process 500 may include combining the timeliness scores to determine an overall timeliness score for the software product (block 530). For example, the device may combine the timeliness scores to determine an overall timeliness score for the software product, as described above. In some implementations, combining the timeliness scores to determine the overall timeliness score for the software product includes averaging the timeliness scores to determine the overall timeliness score. In some implementations, combining the timeliness scores to determine the overall timeliness score for the software product includes applying weights to the timeliness scores to generate weighted timeliness scores, and combining the weighted timeliness scores to determine the overall timeliness score.

As further shown in FIG. 5, process 500 may include processing a second portion of the project management data, with a second plurality of machine learning models, to generate quality scores for the software product (block 540). For example, the device may process a second portion of the project management data, with a second plurality of machine learning models, to generate quality scores for the software product, as described above. In some implementations, processing the second portion of the project management data, with the second plurality of machine learning models, to generate the quality scores for the software product includes two or more of processing the second portion of the project management data, with a rework predictor model, to generate a first quality score, processing the second portion of the project management data, with a defect predictor model, to generate a second quality score, processing the second portion of the project management data, with a cloud readiness model, to generate a third quality score, processing the second portion of the project management data, with a code quality model, to generate a fourth quality score, or processing the second portion of the project management data, with a service call failure model, to generate a fifth quality score.

As further shown in FIG. 5, process 500 may include combining the quality scores to determine an overall quality score for the software product (block 550). For example, the device may combine the quality scores to determine an overall quality score for the software product, as described above. In some implementations, combining the quality scores to determine the overall quality score for the software product includes averaging the quality scores to determine the overall quality score. In some implementations, combining the quality scores to determine the overall quality score for the software product includes applying weights to the quality scores to generate weighted quality scores, and combining the weighted quality scores to determine the overall quality score.

As further shown in FIG. 5, process 500 may include processing a third portion of the project management data, with a third plurality of machine learning models, to generate product readiness scores for the software product (block 560). For example, the device may process a third portion of the project management data, with a third plurality of machine learning models, to generate product readiness scores for the software product, as described above. In some implementations, processing the third portion of the project management data, with the third plurality of machine learning models, to generate the product readiness scores for the software product, includes two or more of processing the third portion of the project management data, with a business value predictor model, to generate a first product readiness score, processing the third portion of the project management data, with an incident inflow predictor model, to generate a second product readiness score, or processing the third portion of the project management data, with a performance and stability predictor model, to generate a third product readiness score.

As further shown in FIG. 5, process 500 may include combining the product readiness scores to determine an overall product readiness score for the software product (block 570). For example, the device may combine the product readiness scores to determine an overall product readiness score for the software product, as described above.

In some implementations, combining the product readiness scores to determine the overall product readiness score for the software product includes averaging the product readiness scores to determine the overall product readiness score. In some implementations, combining the product readiness scores to determine the overall product readiness score for the software product includes applying weights to the product readiness scores to generate weighted product readiness scores, and combining the weighted product readiness scores to determine the overall product readiness score.

As further shown in FIG. 5, process 500 may include utilizing a fourth machine learning model, with the overall timeliness score, the overall quality score, and the overall product readiness score, to generate a success probability for the software product (block 580). For example, the device may utilize a fourth machine learning model, with the overall timeliness score, the overall quality score, and the overall product readiness score, to generate a success probability for the software product, as described above. In some implementations, utilizing the fourth machine learning model, with the overall timeliness score, the overall quality score, and the overall product readiness score, to generate the success probability for the software product includes determining, with the fourth machine learning model, weights to apply to the overall timeliness score, the overall quality score, and the overall product readiness score, applying the weights to the overall timeliness score, the overall quality score, and the overall product readiness score to generate a weighted timeliness score, a weighted quality score, and a weighted product readiness score, and combining the weighted timeliness score, the weighted quality score, and the weighted product readiness score to generate the success probability for the software product.

As further shown in FIG. 5, process 500 may include performing one or more actions based on the success probability for the software product (block 590). For example, the device may perform one or more actions based on the success probability for the software product, as described above. In some implementations, performing the one or more actions based on the success probability includes one or more of generating and providing for display one or more inferences associated with the software product based on the success probability, generating and providing for display one or more recommendations associated with the software product based on the success probability, or modifying the software product based on the success probability. In some implementations, performing the one or more actions based on the success probability includes one or more of causing the software product to be implemented based on the success probability, causing one or more programmers to modify the software product based on the success probability, or retraining one or more of the first plurality of machine learning models, the second plurality of machine learning models, the third plurality of machine learning models, or the fourth machine learning model based on the success probability.

Process 500 may include additional implementations, such as any single implementation or any combination of implementations described below and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
receiving, by a device, project management data identifying a project management life cycle associated with development of a software product;

processing, by the device, a first portion of the project management data, with a first plurality of machine learning models, to generate timeliness scores for the software product;

combining, by the device, the timeliness scores to determine an overall timeliness score for the software product;

processing, by the device, a second portion of the project management data, with a second plurality of machine learning models, to generate quality scores for the software product;

combining, by the device, the quality scores to determine an overall quality score for the software product;

processing, by the device, a third portion of the project management data, with a third plurality of machine learning models, to generate product readiness scores for the software product;

combining, by the device, the product readiness scores to determine an overall product readiness score for the software product;

utilizing, by the device, a fourth machine learning model, with the overall timeliness score, the overall quality score, and the overall product readiness score, to generate a success probability for the software product; and performing, by the device, one or more actions based on the success probability for the software product.

2. The method of claim 1, wherein the processing of the first portion of the project management data, with the first plurality of machine learning models, to generate the timeliness scores for the software product, comprises two or more of:

processing the first portion of the project management data, with a story viability predictor model, to generate a first timeliness score;

processing the first portion of the project management data, with a score creep predictor model, to generate a second timeliness score;

processing the first portion of the project management data, with a delay predictor model, to generate a third timeliness score;

processing the first portion of the project management data, with an inter-team dependencies model, to generate a fourth timeliness score; or processing the first portion of the project management data, with a capacity need model, to generate a fifth timeliness score.

3. The method of claim 1, wherein the combining of the timeliness scores to determine the overall timeliness score for the software product comprises:

averaging the timeliness scores to determine the overall timeliness score.

4. The method of claim 1, wherein the combining of the timeliness scores to determine the overall timeliness score for the software product comprises:

applying weights to the timeliness scores to generate weighted timeliness scores; and combining the weighted timeliness scores to determine the overall timeliness score.

5. The method of claim 1, wherein the processing of the second portion of the project management data, with the second plurality of machine learning models, to generate the quality scores for the software product comprises two or more of:

processing the second portion of the project management data, with a rework predictor model, to generate a first quality score;

processing the second portion of the project management data, with a defect predictor model, to generate a second quality score;

processing the second portion of the project management data, with a cloud readiness model, to generate a third quality score;

processing the second portion of the project management data, with a code quality model, to generate a fourth quality score; or processing the second portion of the project management data, with a service call failure model, to generate a fifth quality score.

6. The method of claim 1, wherein the combining of the quality scores to determine the overall quality score for the software product comprises:

averaging the quality scores to determine the overall quality score.

7. The method of claim 1, wherein the combining of the quality scores to determine the overall quality score for the software product comprises:

applying weights to the quality scores to generate weighted quality scores; and combining the weighted quality scores to determine the overall quality score.

8. A device, comprising:

one or more memories storing a set of instructions; and one or more processors, coupled to the one or more memories, the one or more processors configured to execute the set of instructions to:

receive project management data identifying a project management life cycle associated with development of a software product;

process a first portion of the project management data, with a first plurality of machine learning models, to generate timeliness scores for the software product;

combine the timeliness scores to determine an overall timeliness score for the software product;

process a second portion of the project management data, with a second plurality of machine learning models, to generate quality scores for the software product;

combine the quality scores to determine an overall quality score for the software product;

process a third portion of the project management data, with a third plurality of machine learning models, to generate product readiness scores for the software product;

combine the product readiness scores to determine an overall product readiness score for the software product;

process the overall timeliness score, the overall quality score, and the overall product readiness score, with a fourth machine learning model, to generate a success probability for the software product; and perform one or more actions based on the success probability for the software product.

9. The device of claim 8, wherein the one or more processors, to process the third portion of the project management data, with the third plurality of machine learning models, to generate the product readiness scores for the software product, are configured to two or more of:

process the third portion of the project management data, with a business value predictor model, to generate a first product readiness score;

process the third portion of the project management data, with an incident inflow predictor model, to generate a second product readiness score; or process the third portion of the project management data, with a performance and stability predictor model, to generate a third product readiness score.

10. The device of claim 8, wherein the one or more processors, to combine the product readiness scores to determine the overall product readiness score for the software product, are configured to:
average the product readiness scores to determine the overall product readiness score.

11. The device of claim 8, wherein the one or more processors, to combine the product readiness scores to determine the overall product readiness score for the software product, are configured to:
apply weights to the product readiness scores to generate weighted product readiness scores; and
combine the weighted product readiness scores to determine the overall product readiness score.

12. The device of claim 8, wherein the one or more processors, to process the overall timeliness score, the overall quality score, and the overall product readiness score, with the fourth machine learning model, to generate the success probability for the software product, are configured to:
determine, with the fourth machine learning model, weights to apply to the overall timeliness score, the overall quality score, and the overall product readiness score;
apply the weights to the overall timeliness score, the overall quality score, and the overall product readiness score to generate a weighted timeliness score, a weighted quality score, and a weighted product readiness score; and
combine the weighted timeliness score, the weighted quality score, and the weighted product readiness score to generate the success probability for the software product.

13. The device of claim 8, wherein the one or more processors, to perform the one or more actions based on the success probability, are configured to one or more of:
generate and provide for display one or more inferences associated with the software product based on the success probability;
generate and provide for display one or more recommendations associated with the software product based on the success probability; or
modify the software product based on the success probability.

14. The device of claim 8, wherein the one or more processors, to perform the one or more actions based on the success probability, are configured to one or more of:
cause the software product to be implemented based on the success probability;
cause one or more programmers to modify the software product based on the success probability; or
retrain one or more of the first plurality of machine learning models, the second plurality of machine learning models, the third plurality of machine learning models, or the fourth machine learning model based on the success probability.

15. A non-transitory computer-readable medium storing a set of instructions, the set of instructions comprising:
one or more instructions that, when executed by one or more processors of a device, cause the device to:
receive project management data identifying a project management life cycle associated with development of a software product;
process a first portion of the project management data, with a first plurality of machine learning models, to generate timeliness scores for the software product and an overall timeliness score based on the timeliness scores;
process a second portion of the project management data, with a second plurality of machine learning models, to generate quality scores for the software product and an overall quality score based on the quality scores;
process a third portion of the project management data, with a third plurality of machine learning models, to generate product readiness scores for the software product and an overall product readiness score based on the product readiness scores;
utilize a fourth machine learning model, with the overall timeliness score, the overall quality score, and the overall product readiness score, to generate a success probability for the software product; and
perform one or more actions based on the success probability for the software product.

16. The non-transitory computer-readable medium of claim 15, wherein the one or more instructions, that cause the device to process the first portion of the project management data, with the first plurality of machine learning models, to generate the timeliness scores for the software product, cause the device to two or more of:
process the first portion of the project management data, with a story viability predictor model, to generate a first timeliness score;
process the first portion of the project management data, with a score creep predictor model, to generate a second timeliness score;
process the first portion of the project management data, with a delay predictor model, to generate a third timeliness score;
process the first portion of the project management data, with an inter-team dependencies model, to generate a fourth timeliness score; or
process the first portion of the project management data, with a capacity need model, to generate a fifth timeliness score.

17. The non-transitory computer-readable medium of claim 15, wherein the one or more instructions, that cause the device to process the second portion of the project management data, with the second plurality of machine learning models, to generate the quality scores for the software product, cause the device to two or more of:
process the second portion of the project management data, with a rework predictor model, to generate a first quality score;
process the second portion of the project management data, with a defect predictor model, to generate a second quality score;
process the second portion of the project management data, with a cloud readiness model, to generate a third quality score;
process the second portion of the project management data, with a code quality model, to generate a fourth quality score; or
process the second portion of the project management data, with a service call failure model, to generate a fifth quality score.

18. The non-transitory computer-readable medium of claim 15, wherein the one or more instructions, that cause the device to process the third portion of the project management data, with the third plurality of machine learning models, to generate the product readiness scores for the software product, cause the device to two or more of:
- process the third portion of the project management data, with a business value predictor model, to generate a first product readiness score;
- process the third portion of the project management data, with an incident inflow predictor model, to generate a second product readiness score; or
- process the third portion of the project management data, with a performance and stability predictor model, to generate a third product readiness score.

19. The non-transitory computer-readable medium of claim 15, wherein the one or more instructions, that cause the device to utilize the fourth machine learning model, with the overall timeliness score, the overall quality score, and the overall product readiness score, to generate the success probability for the software product, cause the device to:
- determine, with the fourth machine learning model, respective weights to apply to the overall timeliness score, the overall quality score, and the overall product readiness score;
- apply the respective weights to the overall timeliness score, the overall quality score, and the overall product readiness score to generate a weighted timeliness score, a weighted quality score, and a weighted product readiness score; and
- combine the weighted timeliness score, a weighted quality score, and a weighted product readiness score to generate the success probability for the software product.

20. The non-transitory computer-readable medium of claim 15, wherein the one or more instructions, that cause the device to perform the one or more actions based on the success probability, cause the device to one or more of:
- generate and provide for display one or more inferences associated with the software product based on the success probability;
- generate and provide for display one or more recommendations associated with the software product based on the success probability;
- modify the software product based on the success probability;
- cause the software product to be implemented based on the success probability;
- cause one or more programmers to modify the software product based on the success probability; or
- retrain one or more of the first plurality of machine learning models, the second plurality of machine learning models, the third plurality of machine learning models, or the fourth machine learning model based on the success probability.

* * * * *